(12) United States Patent
Landrieve

(10) Patent No.: US 12,313,125 B2
(45) Date of Patent: May 27, 2025

(54) ROLLING BEARING WITH DISTANCE SENSOR

(71) Applicant: AKTIEBOLAGET SKF, Gothenburg (SE)

(72) Inventor: Franck Landrieve, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 114 days.

(21) Appl. No.: 18/457,422

(22) Filed: Aug. 29, 2023

(65) Prior Publication Data

US 2024/0084854 A1    Mar. 14, 2024

(30) Foreign Application Priority Data

Sep. 9, 2022   (DE) .......................... 102022209408.5

(51) Int. Cl.
*F16C 41/00*     (2006.01)
*F16C 19/38*     (2006.01)

(52) U.S. Cl.
CPC ............ *F16C 41/00* (2013.01); *F16C 19/381* (2013.01); *F16C 2233/00* (2013.01)

(58) Field of Classification Search
CPC ...... F16C 19/38; F16C 19/381; F16C 19/522; F16C 33/58; F16C 33/60; F16C 33/583; F16C 33/586; F16C 33/581; F16C 41/00; F16C 2233/00; G01B 21/16; G01B 5/146; G01B 7/144; G01M 13/04
See application file for complete search history.

(56) References Cited

U.S. PATENT DOCUMENTS

| | | | |
|---|---|---|---|
| 2010/0181854 A1* | 7/2010 | Breucker ................ | F16C 39/02 384/129 |
| 2021/0123474 A1* | 4/2021 | Landrieve ............... | F16C 19/52 |
| 2021/0123479 A1* | 4/2021 | Landrieve ............... | G01S 15/08 |
| 2022/0364605 A1* | 11/2022 | Born ...................... | G01B 17/00 |

FOREIGN PATENT DOCUMENTS

DE         102018131195 A1 *   6/2020

OTHER PUBLICATIONS

Machine Translation of DE-102018131195-A1 (Year: 2020).*

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A rolling bearing is intended to be mounted on a machine and includes a first ring, a second ring, at least one row of axial rolling elements and at least one row of radial rolling elements arranged between the first and second rings. Each of the first and second rings is provided with frontal faces axially delimiting each ring. The rolling bearing further includes at least one first distance sensor mounted on one of the first and second rings and provided with a sensing face oriented axially outward to measure the axial distance between one of the frontal faces of the one ring and a first assembly surface of the machine axially facing the frontal face of the ring.

10 Claims, 2 Drawing Sheets

ROLLING BEARING WITH DISTANCE SENSOR

CROSS-REFERENCE

This application claims priority to German patent application no. 102022209408.5 filed on Sep. 9, 2022, the entire contents of which are fully incorporated herein by reference.

BACKGROUND OF THE INVENTION

The present invention relates to bearings, and more particularly to large-diameter rolling bearings that can accommodate axial and radial loads, and having an inner ring and an outer ring arranged concentrically about an axis of rotation running in an axial direction.

Large-diameter rolling bearings may be used, for example, in a tunnel boring machine, in a mining extraction machine or in a wind turbine. Generally, a large-diameter rolling bearing comprises two concentric, inner and outer rings, and at least two rows of rolling elements, such as rollers, arranged between the rings. Such rolling bearings are generally submitted to high constraints by the structure on which they are assembled by bolts.

Bearing assembly procedures typically specify high level of assembly surface geometry quality and conformance to bolt tensioning specifications in such a way that the bearing geometry can be maintained within specification during machine operation. Because of vibrations and variable constraints, the bolts can loosen over time. It can also happen that constraints or loading may be higher than what the specified bolt and tensioning can support.

Thus, under certain operating conditions, this may lead to high bearing deformation causing a high degree of wear and may lead to bearing failure. As a result, it is common to require periodic inspection operations to monitor the bolt tensioning.

SUMMARY OF THE INVENTION

One aim of the present invention is to overcome the requirement of frequent periodic inspections.

The present invention relates to a rolling bearing intended to be mounted on a machine and comprising a first ring, a second ring, at least one row of axial rolling elements arranged between radial raceways provided on the rings, and at least one row of radial rolling elements arranged between axial raceways provided on the rings. The second ring includes a protruding nose engaged into an annular groove of the first ring and provided with the axial raceway and with the radial raceway of the second ring. Each of the first and second rings is provided with frontal faces axially delimiting the ring.

According to a general feature, the rolling bearing further comprises at least one first distance sensor mounted on one of the first and second rings and provided with a sensing face oriented axially outwardly to measure the axial distance between one of the frontal faces of the ring and a first assembly surface of the machine intended to axially face the frontal face of the ring.

As used in the present application, the terms "axial rolling elements" is understood to mean rolling elements adapted to accommodate axial loads whereas the terms "radial rolling elements" is understood to mean rolling elements adapted to accommodate radial loads.

As a result of the present invention, the tensioning of the bolts used to assemble the rolling bearing on the first assembly surface of the machine may be monitored by sensing the loss of axial contact between the frontal face of the ring and the first assembly surface.

The ring may include a radial hole axially opening onto the frontal face of the ring and inside of which is disposed the first distance sensor. The sensing face of the first distance sensor may be flush with the frontal face of the ring.

Preferably, the rolling bearing further comprises a control unit connected to the first distance sensor and adapted to trigger an alarm when the value of the axial distance detected by the first distance sensor is higher than a first predetermined threshold. The control unit may be located remote from the components of the rolling bearing. Alternatively, the control unit may be mounted on one of the components of the rolling bearing, for example the first ring or the second ring. In one embodiment, the rolling bearing comprises a plurality of first distance sensors spaced apart in the circumferential direction, preferably regularly or evenly spaced.

Preferably, the rolling further comprises at least one second distance sensor mounted on the other one of the first and second rings and provided with a sensing face oriented axially outwardly to measure the axial distance between the frontal face of the other ring, which is axially on the side opposite to the frontal face of the one of the first and second rings, and a second assembly surface of the machine intended to axially face the frontal face of the other ring. Accordingly, the tensioning of the bolts used to assemble the rolling bearing on the second assembly surface of the machine may be monitored.

The other one of the first and second rings may include a radial hole axially opening onto the frontal face of the other ring and inside which is disposed the second distance sensor. The sensing face of the second distance sensor may be flush with the frontal face of the other ring. Preferably, the second distance sensor is connected to the control unit which is adapted to trigger an alarm when the value of the axial distance detected by the second distance sensor is higher than a second predetermined threshold. In one embodiment, the rolling bearing comprises a plurality of second distance sensors spaced apart in the circumferential direction, notably regularly or evenly.

In one embodiment, at least the first ring is formed as a split ring and includes a first ring part and a second ring part axially stacked, the first ring part comprising a frontal face axially bearing against a facing frontal face of the second ring part. In this case, the rolling bearing may include at least one third distance sensor mounted on one of the first and second ring parts to measure the axial distance between the frontal faces of the two ring parts.

The tensioning of the bolts used to assemble the first ring on the machine can be monitored by sensing the loss of axial contact between the frontal faces of the ring parts. Preferably, the third distance sensor is connected to the control unit, which is adapted to trigger an alarm when the value of the axial distance detected by the third distance sensor is higher or greater than a third predetermined threshold.

The ring part may comprise a radial hole axially opening onto the associated frontal face and inside which is disposed the third distance sensor. The sensing face of the third distance sensor may be flush with the associated frontal face of the ring part.

In one embodiment, the rolling bearing comprises a plurality of third distance sensors spaced apart in the circumferential direction, notably regularly or evenly.

In one embodiment, the rolling bearing comprises at least two rows of axial rolling elements each arranged between radial raceways provided on the rings, the two rows of axial rolling elements being disposed axially on each side of the nose of the second ring.

BRIEF DESCRIPTION OF THE SEVERAL VIEWS OF THE DRAWINGS

The present invention and its advantages will be better understood by studying the detailed description of a specific embodiment given by way of a non-limiting example and illustrated by the appended drawings on which.

DETAILED DESCRIPTION OF THE INVENTION

Figure 1:
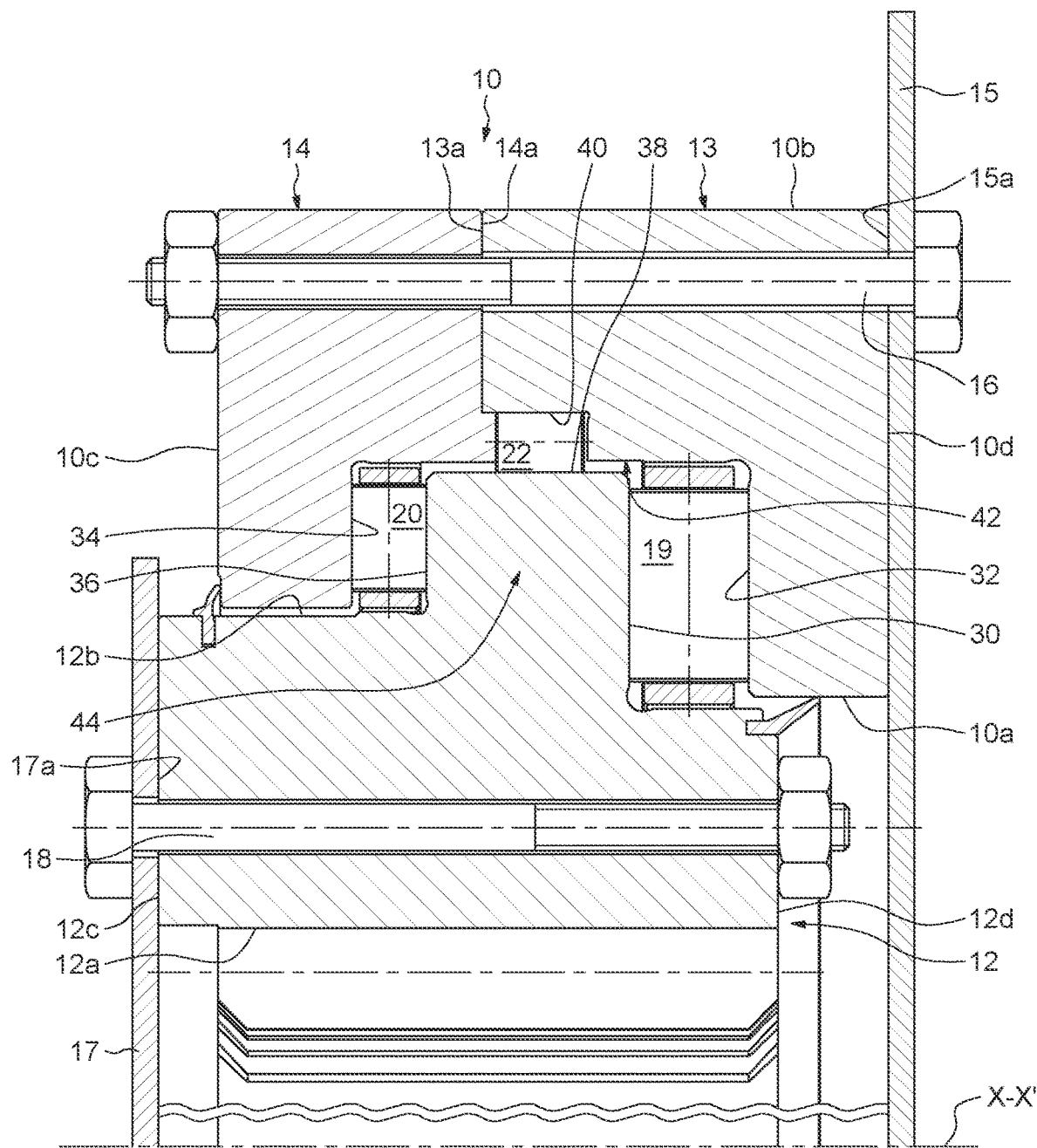
FIG. 1 is a partial cross-section of a rolling bearing according to an example of the invention.
Figure 2:
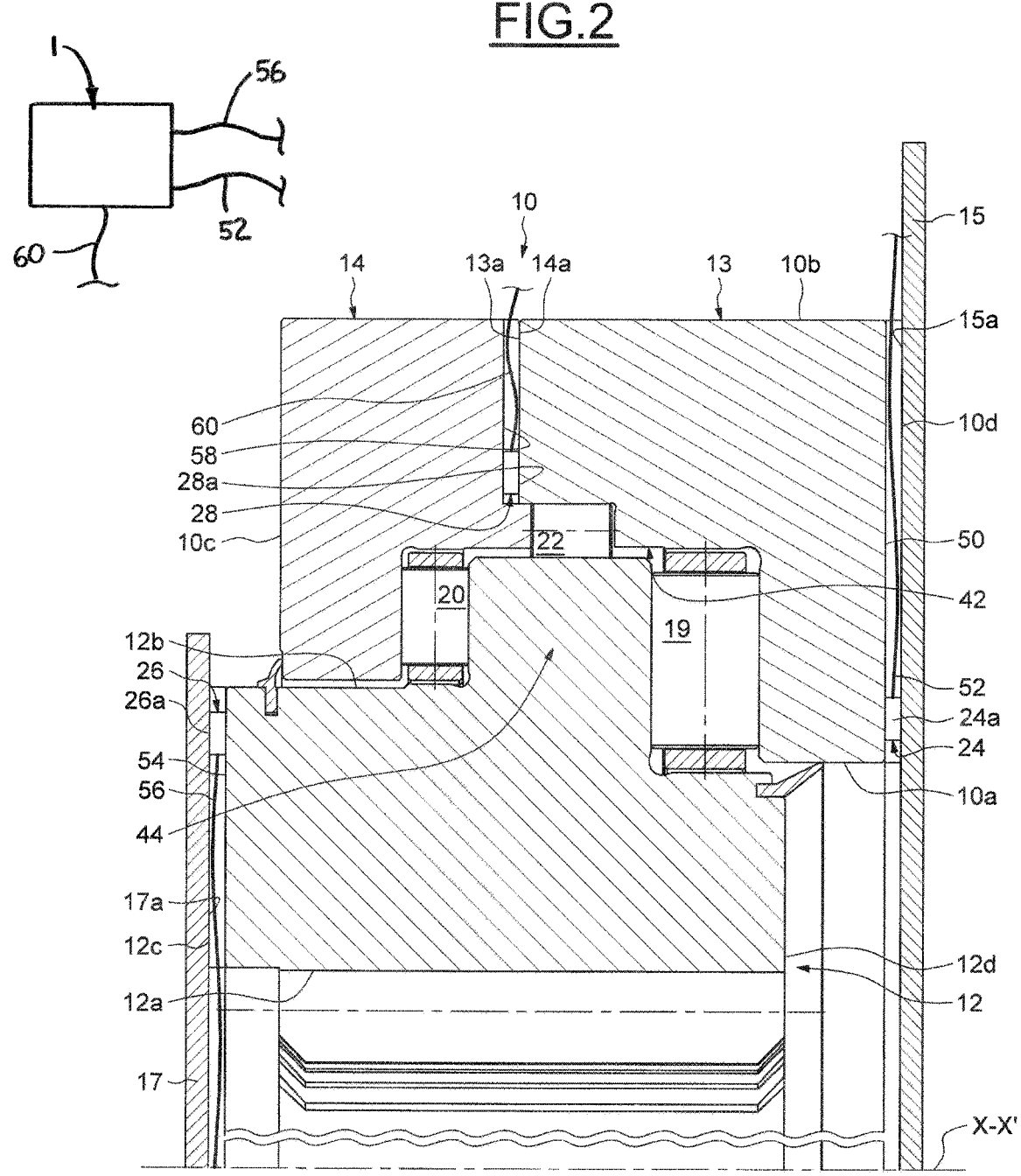
FIG. 2 is another partial cross-section of the rolling bearing of FIG. 1

A rolling bearing depicted in FIGS. 1 and 2 is a large-diameter rolling bearing comprising a first ring 10 and a second ring 12. In the illustrated example, the first ring 10 is the outer ring whereas the second ring 12 is the inner ring. The rolling bearing may, for example, be used in a machine, such as tunnel boring machine, a wind turbine or any other machines using a large diameter rolling bearing.

The outer and inner rings 10, 12 are concentric and extend axially along the bearing rotation axis X-X' which runs in an axial direction. In this illustrated example, the rings 10, 12 are of the solid type.

The outer ring 10 is formed as a split ring and comprises a first ring part 13 and a second ring part 14 stacked one relative to the other in the axial direction. The two ring parts 13, 14 are provided with a plurality of aligned axial through-holes (not indicated) which each receive a separate one of a plurality of bolts 16 in order to join the ring parts 13, 14 and to assemble the outer ring 10 to a first part 15 of the structure of the associated machine.

The inner ring 12 is also provided with a plurality of axial through-holes (not indicated) which each receive a separate one of a plurality of bolts 18 in order to assemble the inner ring 10 to a second part 17 of the associated machine. The first and second parts 15, 17 of the machine are axially disposed on each side of the rolling bearing. In other words, the first part 15 of the machine is disposed on one axial side of the rolling bearing and the second part 17 of the machine is disposed on the other, opposing axial side of the bearing.

In the illustrated example, the rolling bearing comprises two rows of axial rollers 19, 20 which are arranged between the outer and inner rings 10, 12 in order to form an axial thrust, and a row of radial rollers 22 which are arranged between the rings to form a radial thrust.

As will be described later, the rolling bearing also comprises first and second distance sensors 24, 26 for respectively detecting the axial distance between the outer ring 10 and the first part 15 of the machine and the axial distance between the inner ring 12 and the second part 17 of the machine. In the illustrated example, the rolling bearing preferably further comprises third distance sensors 28 for detecting the axial distance between the first and second part 13, 14 of the outer ring.

The rollers 19, 20, 22 of each row of rolling elements are identical to one another. The axis of rotation of each roller 22 is parallel to the axis X-X' of the bearing and perpendicular to the axes of each of the rollers 19, 20. In the illustrated example, the axial length of each one of the rollers 19 is greater than the axial length of each one of the rollers 20. Alternatively, the axial length of the rollers 19 may be lesser than, or may be equal to, the axial length of the rollers 20. As a further alternative, the row of rollers 19 may be replaced by two rows of superimposed rollers.

The axial rollers 19 are arranged axially between annular radial raceways 30, 32 respectively formed on the inner and outer rings 12, 10; that is, the rollers 19 are each disposed against and between an annular radial raceway 30 formed on the inner ring 12 and an annular radial raceway 32 formed on the outer ring 10. The raceways 30, 32 face each other in the axial direction. The rolling surface of each axial roller 19 is in axial contact with each one of the raceways 30, 32.

The axial rollers 20 are arranged axially between annular radial raceways 34, 36 respectively formed on the inner and outer rings 12, 10; that is, the rollers 20 are each disposed against and between an annular radial raceway 34 formed on the inner ring 12 and an annular radial raceway 36 formed on the outer ring 10. The raceways 34, 36 axially face each other. The rolling surface of each axial roller 20 is in axial contact with each one of the raceways 34, 36. The two rows of axial rollers 19, 20 are spaced apart from each other in the axial direction.

The radial rollers 22 are arranged radially between annular axial raceways 38, 40 respectively formed on the inner and outer rings 12, 10. In other words, the radial rollers 22 are each disposed against and between an annular axial raceway 38 formed on the inner ring 12 and an annular axial raceway 40 formed on the outer ring 10. The raceways 38, 40 face each other in the radial direction. The rolling surface of each radial roller 22 is in radial contact with the raceways 38, 40. Preferably, the row of radial rollers 22 is radially offset outwards with respect to the two rows of axial rollers 19, 20 and the row of radial rollers 22 is located axially between the rows of axial rollers 19, 20.

The outer ring 10 includes an annular groove 42 opening in a radial direction inwardly towards the inner ring 12. Specifically, the outer ring 10 includes an inner stepped cylindrical bore 10a from which the groove 42 is formed. The outer ring 10 also includes an outer cylindrical surface 10b which is radially opposite to the bore 10a. The outer ring 10 further includes two opposite radial frontal faces 10c, 10d which axially delimit the bore 10a and the outer surface 10b of the ring. The frontal faces 10c, 10d also axially delimit the outer ring 10 and further axially delimit the thickness of the outer ring 10.

As previously mentioned, the outer ring 10 is preferably divided in the axial direction in two separate parts, the ring part 13 and the ring part 14. The two ring parts 13, 14 delimit together the groove 42. The radial raceway 32 is located on the ring part 13 and the radial raceway 34 is located on the ring part 14 of the outer ring 10. The frontal face 10d is located on the ring part 13 and the frontal face 10c is located on the ring part 14.

The ring part 13 and the second ring part 14 are stacked one relative to the other in the axial direction. The first ring part 13 has a frontal face 13a axially bearing against a facing frontal face 14a of the ring part 14.

The inner ring 12 comprises an annular protruding nose 44 engaging into the annular groove 42 of the outer ring 10. The nose 44 extends radially outwardly from a remainder of the inner ring 12.

The two rows of axial rollers 19, 20 are arranged axially between the nose 44 of the inner ring 12 and the groove 42 of the outer ring 10. The rows of axial rollers 19, 20 are disposed on each axial side of the nose 44. The radial raceways 30, 36 are located on the nose 44 of the inner ring 12 while the radial raceways 32, 34 are located on the groove 42 of the outer ring 10.

The row of radial rollers 22 is arranged radially between the nose 44 of the inner ring 12 and the groove 42 of the outer ring 10. The axial raceways 38, 40 are respectively located on the nose 44 and the groove 42; that is, axial raceway 38 is located on the nose 44 and the axial raceway 40 is located on the groove 42.

In the illustrated example, the inner ring 12 is made in one part or is of one-piece construction. Alternatively, the inner ring 12 may be divided in the axial direction in at least two separate parts secured together by any appropriate means. In another variant, the nose 40 may be made separately from the remainder or main part of the inner ring 10 and attached thereto by any appropriate means.

The inner ring 12 comprises an inner cylindrical bore 12a and a stepped outer cylindrical surface 12b which is radially opposite to the bore 12a. In the illustrated example, the bore 12a of the inner ring is provided with a gear teeth (not indicated). The inner ring 12 further comprises two opposite radial frontal faces 12c, 12d which axially delimit the bore 12a and the outer cylindrical surface 12b. The frontal faces 12c, 12d axially delimit the inner ring 12 and also axially delimit the thickness of the inner ring 12. The protruding nose 44 protrudes radially outwardly from the outer cylindrical surface 12b.

The second part 17 of the machine axially abuts against the frontal face 12c of the inner ring 12 whereas the first part 15 axially abuts against the frontal face 10d of the outer ring 10. The second part 17 includes an assembly surface 17a axially bearing against the frontal face 12c and the first part 15 includes an assembly surface 15a axially bearing against the frontal face 10d in normal use of the machine.

As previously mentioned, the first distance sensors 24 are provided to measure the axial distance between the outer ring 10 and the first part 15 of the machine. Only one of the distance sensors 24 is shown on FIG. 2. The distance sensors 24 are spaced apart in the circumferential direction, preferably regularly or evenly. For example, four distance sensors 24 may be provided and spaced apart every 90°. Alternatively, a different number and/or arrangement of distance sensors 24 may be provided. In another variant, only one distance sensors 24 is provided.

Each distance sensor 24 is provided to measure an axial distance between the frontal face 10d of the outer ring 10 and the assembly surface 15a of the first part 15 of the machine which axially faces the frontal face 10d.

Each distance sensor 24 has a sensing face 24a oriented axially outwardly toward the assembly surface 15a of the first part 15 of the machine. The sensing face 24a axially faces the assembly surface 15a. Preferably, the sensing face 24a is axially flush with the frontal face 10d of the outer ring 10. Alternatively, the sensing face 24a may be axially offset inwardly with respect to the frontal face 10d.

The outer ring 10 is preferably provided with a plurality of first radial holes 50 and each one of the first distance sensors 24 is located with a separate one of the radial holes 50. Each hole 50 extends from the outer surface 10b of the outer ring and opens onto the bore 10a. Each hole 50 also opens on the frontal face 10d. Each hole 50 axially faces the assembly surface 15a of the first part 15 of the machine. Preferably, the shape of each hole 50 is complementary to that of the associated distance sensor 24. Further, each distance sensor 24 is secured inside the associated hole 50 by any appropriate means, for example, by force-fitting or by friction.

Each distance sensor 24 has a longitudinal axis (not referenced) extending radially and perpendicular to the axis X-X' of the rolling bearing. In the disclosed example, each distance sensor 24 also comprises an output connecting cable 52 for transmitting sensing data which extends outwardly. Specifically, the output cable 52 extends radially outwardly. The output cable 52 connects the associated distance sensor 24 to a control unit 1 of the rolling bearing so as to transmit measured distances. Alternatively, the sensors 24 may be formed without any output cable when the sensors 24 are each a wireless sensor.

Each sensor 24 may be an inductive distance sensor, an inductive proximity switch, an ultrasonic distance sensor, or an optical distance sensor. Alternatively, each sensor 24 may be a mechanical distance sensor provided with a contact stylus. In this last case, the mechanical sensor faces the assembly surface 15a of the first part 15 of the machine and also contacts the assembly surface 15a.

As previously mentioned, the second distance sensors 26 are provided to measure an axial distance between the inner ring 12 and the second part 17 of the machine. Only one of the distance sensors 26 is shown on FIG. 2. The distance sensors 26 are spaced apart in the circumferential direction, preferably regularly or evenly. For example, four distance sensors 26 may be provided and spaced apart every 90°. Alternatively, a different number and/or arrangement of the second distance sensors 26 may be provided. In another variant, only one distance sensor 26 is provided.

Each distance sensor 26 is provided to measure an axial distance between the frontal face 12c of the inner ring 12 and the assembly surface 17a of the second part 17 of the machine which axially faces the frontal face 12c.

Each distance sensor 26 has a sensing face 26a oriented axially outwardly toward the assembly surface 17a of the second part 17 of the machine. The sensing face 26a axially faces the assembly surface 17a. Preferably, the sensing face 26a is axially flush with the frontal face 12c of the inner ring 12. Alternatively, the sensing face 26a may be offset axially inwardly with respect to the frontal face 12c.

Preferably, the inner ring 12 is provided with a plurality of second radial holes 54 and each second distance sensor 26 is disposed within a separate one of the second radial holes 54. Each hole 54 extends from the outer surface 12b of the inner ring 12 and opens onto the bore 12a. Each hole 54 also opens on the frontal face 12c and axially faces the assembly surface 17a of the second part 17 of the machine. Preferably, the shape of each hole 54 is complementary to that of the associated distance sensor 26. Each distance sensor 26 is secured inside the associated hole 54 by any appropriate means, for example by force-fitting or friction.

Each distance sensor 26 has a longitudinal axis (not referenced) extending radially and perpendicular to the axis X-X' of the rolling bearing. In the disclosed example, each distance sensor 26 also comprises an output connecting cable 56 for transmitting sensing data which extends inwardly. Specifically, the output cable 56 extends radially inwardly. The output cable 56 connects the associated distance sensor 26 to the control unit 1 of the rolling bearing so as to transmit measured distances. Alternatively, the second distance sensors 26 may be formed without any output cable when the sensors 26 wireless sensors.

Each sensor 26 may be an inductive distance sensor, an inductive proximity switch, an ultrasonic distance sensor, or an optical distance sensor. Alternatively, each sensor 26 may be a mechanical distance sensor provided with a contact stylus. In this last case, the mechanical sensor faces the assembly surface 17a of the second part 17 of the machine and also contacts the assembly surface 17a.

As previously mentioned, the third distance sensors 28 are provided to measure the axial distance between the first and second part 13, 14 of the outer ring 10. Only one of the distance sensors 28 is shown on FIG. 2. The distance sensors 28 are spaced apart in the circumferential direction, preferably regularly or evenly. For example, four distance sensors 28 may be provided and placed every 90° apart from each other. Alternatively, a different number and/or arrangement of distance sensors 28 may be provided. In another variant, only one distance sensor 28 is provided.

Each third distance sensor 28 is provided to measure an axial distance between the frontal face 13a of the first ring part 13 of the outer ring 10 and the frontal face 14a of the second ring part 14.

Each third distance sensor 28 includes a sensing face 28a oriented axially toward the frontal face 13a of the first ring part 13. The sensing face 28a axially faces the frontal face 13a. Preferably, the sensing face 28a is axially flush with the frontal face 13a. Alternatively, the sensing face 28a may be axially offset with respect to the frontal face 13a.

The second ring part 14 of the outer ring 10 is provided with a plurality of third radial holes 58 and each third distance sensor 28 is disposed within a separate one of the holes 58. Each hole 58 extends from the outer surface 10b of the outer ring 10. Each hole 58 axially faces the frontal face 13a of the first ring part 13. Preferably, the shape of each hole 58 is complementary to that of the associated distance sensor 28. Each distance sensor 28 is secured inside the associated hole 58 by any appropriate means, for example by force-fitting or friction.

Each third distance sensor 28 has a longitudinal axis (not referenced) extending radially and perpendicular to the axis X-X' of the rolling bearing. In the disclosed example, each distance sensor 28 also comprises an output connecting cable 60 for transmitting sensing data which extends outwardly, specifically radially outwardly. The output cable 60 connects the associated distance sensor 28 to the control unit 1 of the rolling bearing so as to transmit measured distances. Alternatively, the sensors 28 may be formed without an output cable when the sensors 28 are wireless sensors.

In the disclosed example, the distance sensors 28 are provided on the second ring part 14 of the outer ring 10. Alternatively, the distance sensors 28 may be provided on the first ring part 13 of the outer ring 10. In this case, the sensing face 28a of each distance sensor 28 axially faces the frontal face 14a.

Each sensor 28 may be an inductive distance sensor, an inductive proximity switch, an ultrasonic distance sensor, or an optical distance sensor. Alternatively, each sensor 28 may be a mechanical distance sensor provided with a contact stylus. In this last case, the mechanical sensor faces the frontal face 13a of the first ring part 13 and also contacts the frontal face 13a.

The first distance sensors 24 allow measurements and continuous monitoring of the axial distance between the frontal face 10d of the outer ring and the assembly surface 15a of the first part of the machine. The distance sensors 24 allow tension monitoring of the bolts 16. When the value of this distance exceeds a first predetermined threshold, the control unit 1 of the bearing triggers an alarm.

The second distance sensors 26 allow measurements and continuous monitoring of the axial distance between the frontal face 12c of the inner ring 12 and the assembly surface 17a of the second part 17 of the machine. The distance sensors 26 allow tension monitoring of the bolts 18. When the value of this distance exceeds a second predetermined threshold, the control unit 1 of the bearing triggers an alarm. The second predetermined threshold may be equal or different from the first predetermined threshold.

The third distance sensors 28 allow measurements and continuous monitoring of the axial distance between the frontal faces 13a, 14a of the outer ring 10. The distance sensors 28 allow tension monitoring of the bolts 16. When the value of this distance exceeds a third predetermined threshold, the control unit 1 of the bearing triggers an alarm. The third predetermined threshold may be equal or different from the first and second predetermined thresholds.

In the illustrated example, the rolling bearing is provided with all of the first, second and third distance sensors 24, 26 and 28, respectively. Alternatively, the rolling bearing may be provided only with the distance sensors 24, only with the distance sensors 26 or only with the distance sensors 28. In another variant, the rolling bearing may include the first distance sensors 24 and either the second distance sensors 26 or the third distance sensors 18. Alternatively, the rolling bearing may be provided only with the distance sensors 26 and 28.

Otherwise, as previously mentioned, in this illustrated example, the first ring of the rolling bearing is the outer ring 10 whereas the second ring is the inner ring 12. As an alternative, it could be possible to provide a reversed arrangement with the first ring 10 forming the inner ring and the second ring 12 forming the outer ring. In this case, the groove formed on the inner ring opens radially outwardly and the nose of the outer ring extends radially inwardly.

In the described examples, the rolling bearing is provided with a rolling bearing comprising three rows of rolling elements. Alternatively, the rolling bearing may comprise only two rows of rolling elements, or four or more rows of rolling elements. In the illustrated example, the rolling elements are rollers. The rolling bearing may comprise any other type of rolling elements, for example balls, needles, tapered rollers, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A rolling bearing mountable on a machine, the rolling bearing comprising:
   a first ring having an annular groove, a radial raceway, an axial raceway, and opposing frontal faces axially delimiting the first ring;
   a second ring including a protruding nose engaged into the annular groove of the first ring, the nose having an axial raceway and a radial raceway, and opposing frontal faces axially delimiting the second ring;
   at least one row of axial rolling elements arranged between the radial raceways on the first and second rings;
   at least one row of radial rolling elements arranged between the axial raceways of the first and second rings; and
   at least one distance sensor mounted on one of the first and second rings and having a sensing face oriented axially outwards to measure an axial distance between one of the frontal faces of the one of the first and second rings and a first assembly surface of the machine axially facing the frontal face of the one of the first and second rings.

2. The rolling bearing according to claim 1, wherein the one of the first and second rings including a radial hole axially opening onto the frontal face of the one ring, the distance sensor being disposed within the radial hole.

3. The rolling bearing according to claim 1, wherein the sensing face of the distance sensor is flush with the frontal face of the one ring.

4. The rolling bearing according to claim 1, further comprising a control unit connected to the distance sensor and adapted to trigger an alarm when a value of the axial distance detected by the distance sensor is greater than a first predetermined threshold.

5. The rolling bearing according to claim 1, wherein the distance sensor is a first distance sensor and the rolling bearing further comprises at least one second distance sensor mounted on the other one of the first and second rings and provided with a sensing face oriented axially outwards to measure an axial distance between the frontal face of the other one of the first and second rings, the frontal face of the other one of the first and second rings being axially on the side opposite to the frontal face of the one of the first and second rings, and a second assembly surface of the machine axially facing the frontal face of the other one of the first and second rings.

6. The rolling bearing according to claim 5, wherein the other one of the first and second rings includes a radial hole axially opening onto the frontal face of the other one of the first and second rings, the second distance sensor being disposed within the radial hole of the other one of the first and second rings.

7. The rolling bearing according to claim 5, wherein the sensing face of the second distance sensor is flush with the frontal face of the other one of the first and second rings.

8. The rolling bearing according to claim 5, further comprising a control unit connected to the first distance sensor and the second distance sensor, the control unit being adapted to trigger an alarm when a value of the axial distance detected by the first distance sensor is greater than a first predetermined threshold and adapted to trigger an alarm when the value of the axial distance detected by the second distance sensor is greater than a second predetermined threshold.

9. The rolling bearing according to claim 1, wherein:
   at least the first ring is formed as a split ring and includes a first ring part and a second ring part axially stacked with the first ring part, the first ring part having a frontal face axially bearing against a facing frontal face of the second ring part; and
   the rolling bearing further comprises at least one third distance sensor mounted on one of the first and second ring parts to measure an axial distance between the frontal faces of the first and second ring parts.

10. The rolling bearing according to claim 9, further comprising a control unit, the third distance sensor being connected to the control unit and the control unit being adapted to trigger an alarm when a value of the axial distance detected by the third distance sensor is greater than a third predetermined threshold.

* * * * *